United States Patent [19]

Chamran et al.

[11] 4,332,470
[45] Jun. 1, 1982

[54] SPECTROPHOTOMETER SYSTEM HAVING POWER LINE SYNCHRONIZATION

[75] Inventors: Morteza M. Chamran, Elmhurst, Ill.; Larkin B. Scott, Fort Worth, Tex.; Paul B. Williams, Lombard, Ill.; Michael A. Ford, Maidenhead, England

[73] Assignee: The Perkin-Elmer Corporation, Norwalk, Conn.

[21] Appl. No.: 128,289

[22] Filed: Mar. 7, 1980

[51] Int. Cl.³ .............................. G01J 3/08; G01J 3/42
[52] U.S. Cl. ................................................... 356/325
[58] Field of Search ......................... 356/323, 324, 325

[56] References Cited

U.S. PATENT DOCUMENTS

| | | | |
|---|---|---|---|
| 4,030,829 | 6/1977 | Hooper | 356/325 |
| 4,132,481 | 1/1979 | Ford et al. | 356/325 |
| 4,176,957 | 12/1979 | Maeda et al. | 356/325 X |

Primary Examiner—Vincent P. McGraw
Attorney, Agent, or Firm—S. A. Giarratana; E. T. Grimes; R. A. Hays

[57] ABSTRACT

A light chopper for chopping the monochromatic light beam of a spectrophotometer system, has a rotatable shaft driven by a synchronous motor at a frequency proportional to the power line frequency. An aperture bearing disc rotates with the shaft in relation to a photocell/detector array for generating digital timing signals for use by a microcomputer to control the tasks of the spectrophotometer system in synchronism with line frequency. The microcomputer monitors line frequency for responsively programming a programmable divider for generating an index signal for proportionally sequencing the wavelength of the monochromatic beam through a predetermined spectral range.

The rotatable shaft is coupled to the synchronous motor via a mechanical pin drive and a set of attracting magnets which are spaced in face confronting relation at the point of coupling for providing compliance and damping between the coupled shaft and synchronous motor, thus minimizing phase jitter of the timing system and permitting rejection of time frequency stray circuit pickup.

16 Claims, 4 Drawing Figures

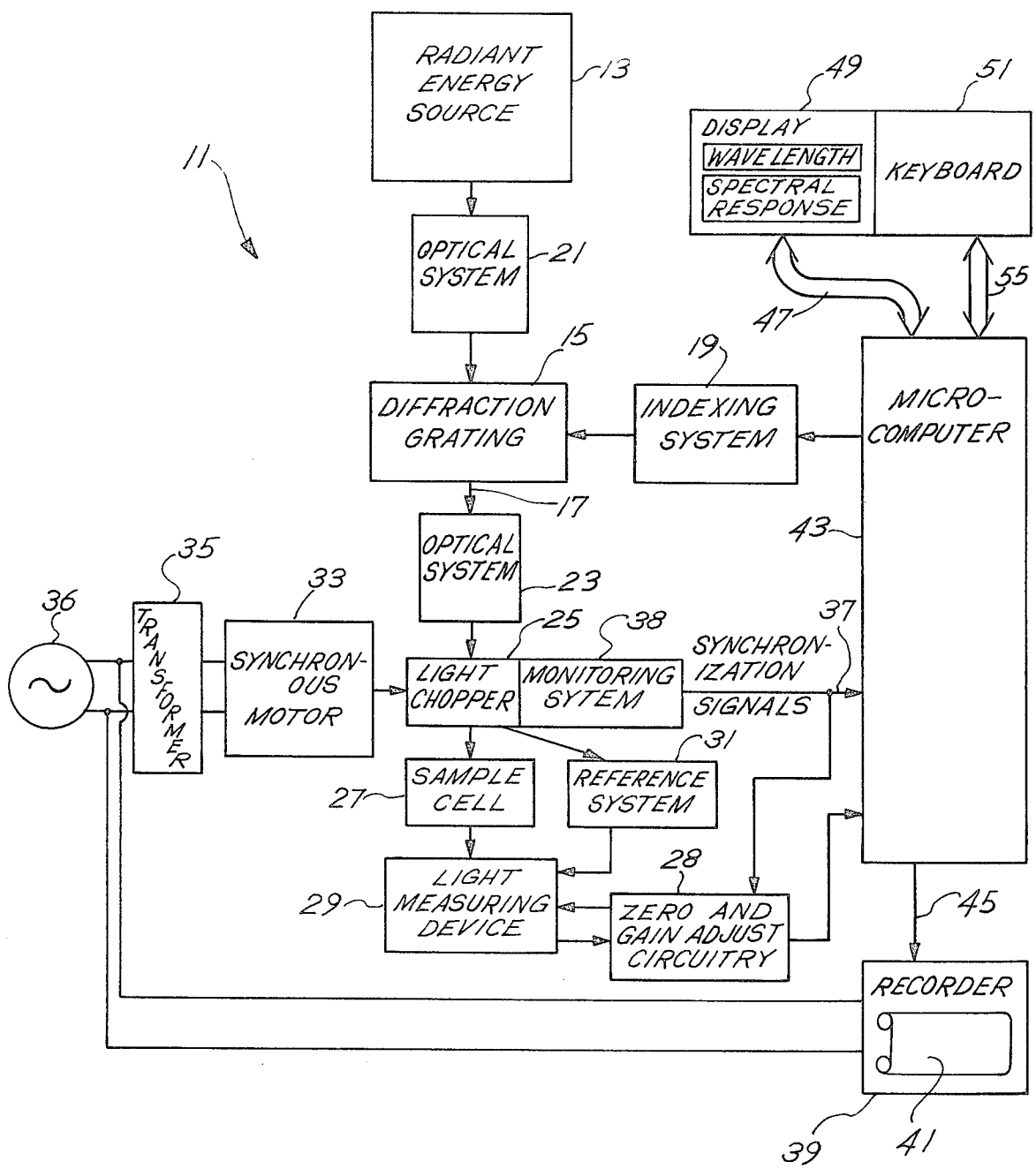

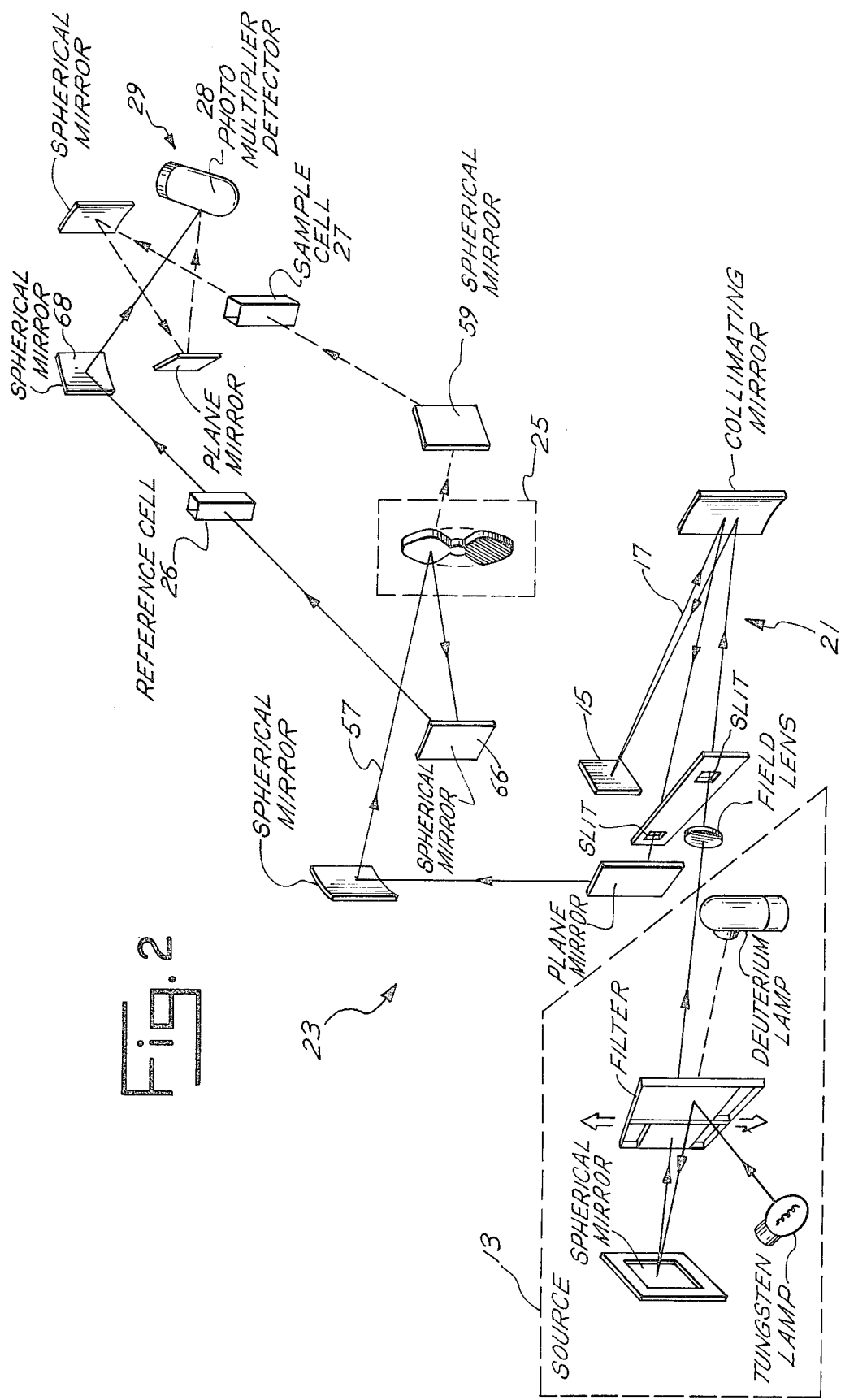

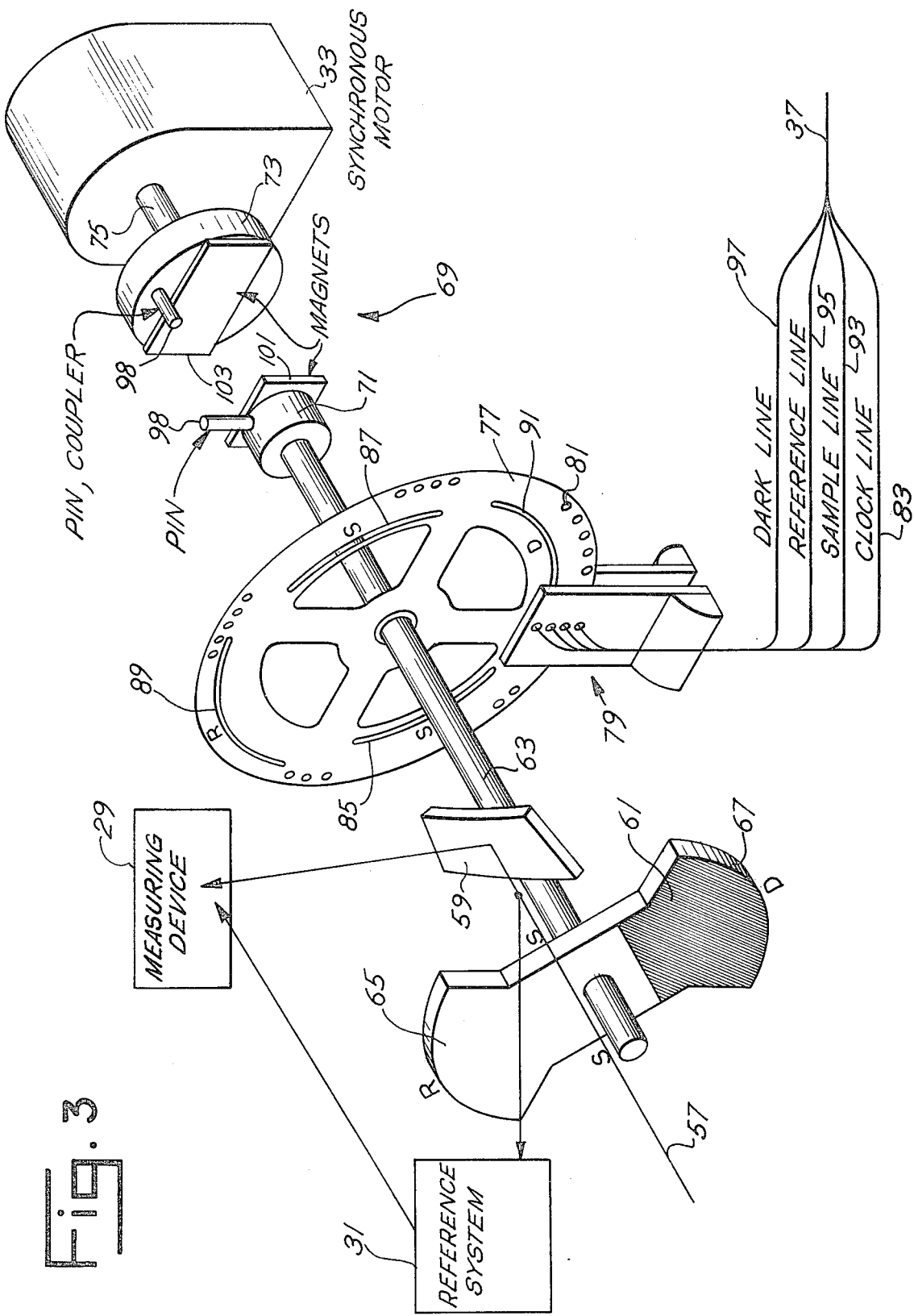

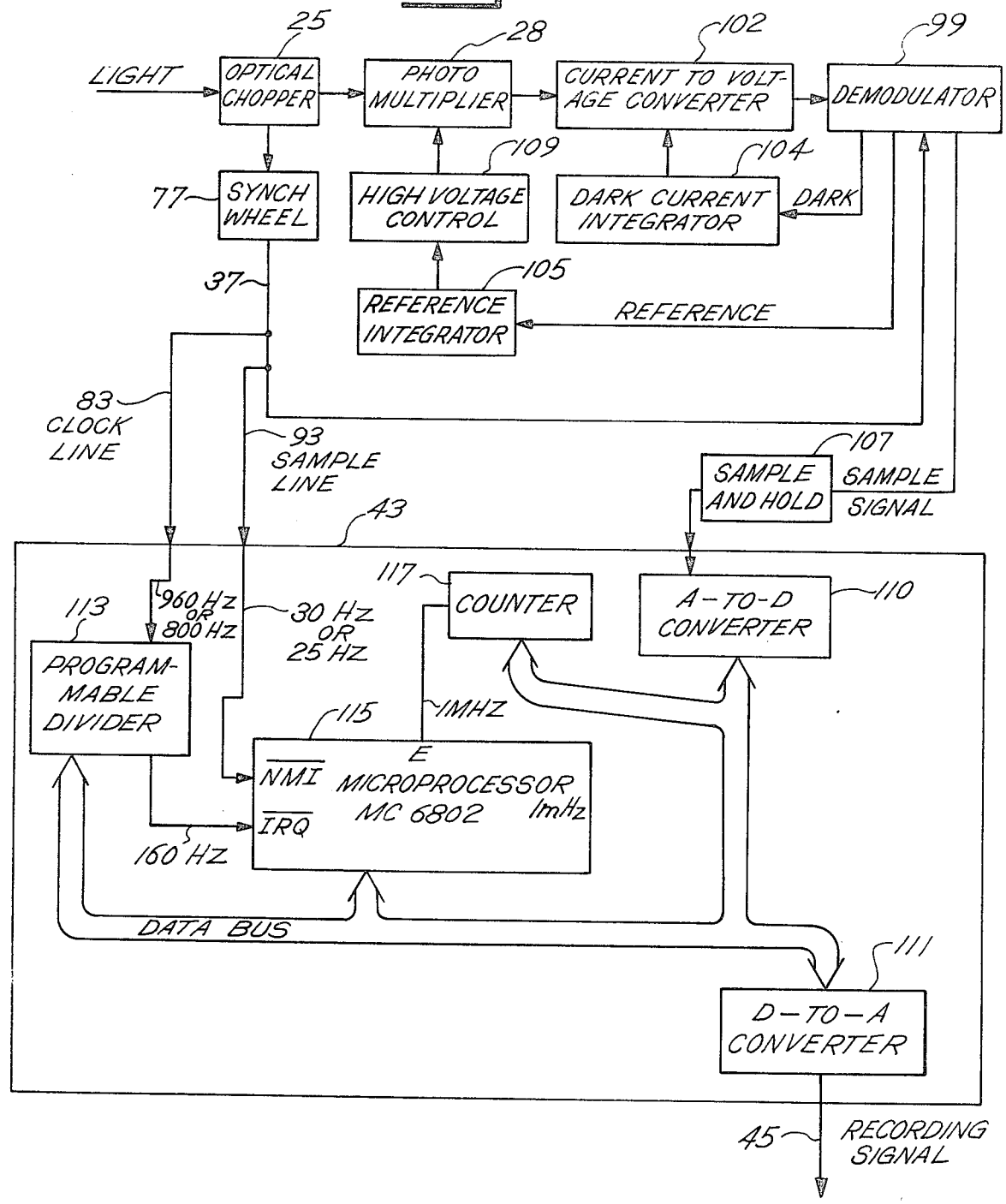

SPECTROPHOTOMETER SYSTEM HAVING POWER LINE SYNCHRONIZATION

RELATED PATENT APPLICATIONS

This application is related to the following four U.S. Patent Applications filed on even date herewith: (1) Ser. No. 128,029, entitled MANUAL WAVELENGTH ADJUSTMENT FOR A MICROPROCESSOR BASED SPECTROPHOTOMETER, by L. Scott et al.; (2) Ser. No. 128,030, entitled FILTER INDEXING FOR SPECTROPHOTOMETER SYSTEM, by M. Charman et al; (3) Ser. No. 128,028, entitled SAFE MEMORY SYSTEM FOR A SPECTROPHOTOMETER, by P. Williams et al; (4) Ser. No. 128,027, entitled SPECTROPHOTOMETER IMPROVEMENT OF IMPROVED AUTOMATIC WAVELENGTH INDEXING INITIALIZATION APPARATUS, by M. Charman et al.

BACKGROUND OF THE INVENTION

The invention relates to a spectrophotometer system and more particularly to synchronization of the tasks performed by a microcomputer in controlling the spectrophotometer.

In a spectrophotometer system, the recorder used to record a graphical representation of the spectral response of the substance being analyzed is driven by conventional alternating current, A.C., 50 or 60 hertz, Hz., power line current. Spurious noise and fluctuations in the power line frequency affect the movement of the recording sheet, adding error to the graphical recording. Therefore, it is highly desirable to synchronize the analyzation process with the power line frequency so that the recording instrument of the recorder is driven in synchronism with the movement of the recording sheet.

It is, therefore, an object of the present invention to synchronize various tasks performed by the microcomputer in synchronism with power line frequencies.

It is a further object of the present invention to provide a synchronization system for a microcomputer based spectrophotometer which may receive A.C. power at 50 Hz. or 60 Hz.

SUMMARY OF THE INVENTION

These and other objects of the invention are achieved by monitoring the line frequency of the A.C. source powering a spectrophotometer and responsively generating an output digital signal at line frequency. Another digital signal is utilized by a microcomputer for controlling the rate of sequencing of wavelengths of a monochromatic light beam utilized in the spectrophotometer analysis.

In the preferred embodiment, the monitoring of the line frequency is performed in synchronism with a chopping of the monochromatic light for generating an indexing (stepping) signal for control of wavelength sequencing and for generating a sample signal for sampling the spectral response of the monochromatic light passing through a sample cell. The spectral response is manipulated by the microcomputer and an analog recording signal is generated in substantial synchronism with the sampling signal for transmission of a recording signal to a data recorder which is driven by the power line.

BRIEF DESCRIPTION OF THE DRAWING

FIG. 1 is a block diagram of the preferred embodiment of a spectrophotometer of the present invention.

FIG. 2 is a perspective diagram of the optical paths of the spectrophotometer of FIG. 1.

FIG. 3 is a perspective view and partial block diagram illustrating a chopper mirror and a synchronization disc of the spectrophotometer of FIG. 1.

FIG. 4 is a block diagram of the sampling circuit and the microcomputer of the spectrophotometer of FIG. 1.

DESCRIPTION OF THE PREFERRED EMBODIMENT

The above related applications disclose specific apparatus of features broadly described herein, and such applications are incorporated herein by reference. Specific apparatus necessary for understanding the preferred embodiment of the present invention are described, as follows:

Referring to FIG. 1, a spectrophotometer system 11 includes a radiant energy source 13 which provides a beam of radiation to a diffraction grating 15 for generating a beam 17 of monochromatic radiant energy (hereinafter monochromatic light). An indexing system 19 controls diffraction grating 15 for changing the wavelength of the monochromatic light in sequence over a predetermined spectral range.

A first optical system 21 is disposed between source 13 and grating 15, and a second optical system 23 is disposed between grating 15 and a light chopper 25. The optical systems 21, 23 insure proper generation of the monochromatic light and serve to direct the monochromatic light through light chopper 25, through a sample cell 27 and onto a light measuring device 29. Measuring device 29 generates a sample signal as the measure of a spectral range of radiant energy passing through the substance in sample cell 27, hereinafter referred to as the spectral response of light measuring device 29.

Light chopper 25 is disposed between optical system 23 and sample cell 27 for chopping the light beam prior to its reaching sample cell 27. Light chopper 25 permits passage of the monochromatic beam to sample cell 27 in time frame segments, and reflects a portion of the monochromatic beam during other time frame segments through a reference system 31 and onto light measuring device 29. During passage of the light beam through reference system 31, light measuring device 29 generates a reference signal for use to reference the amplification of the sample signal by a circuitry 28, as described hereinafter.

Light chopper 25 is driven by a synchronous motor 33 which receives alternating current (A.C.) from a transformer 35 which receives power from a standard electrical outlet (not shown) connected to conventional house current supplied by a power source 36. The preferred system is constructed for use with a house current power source 36 which alternates at 50 Hz. or 60 Hz. Synchronous motor 33 drives light chopper 25 at a speed proportional to the frequency of the alternating current from source 36, and a monitoring system 38 generates a plurality of synchronization signals onto a bus 37, which are proportional to the line frequency of power source 36. The synchronization signals appearing on bus 37 serve to synchronize the instrument with the line frequency, as described hereinafter.

A recorder 39 is also connected to power source 36 for powering the recorder to drive a record receiving medium 41 for receiving recording information indicative of the spectral response indicated by the sample signal from measuring device 29. Record sheet 41 is driven by power source 36 at a rate defined by the line frequency of the power source.

A conventional microcomputer 43 controls the overall system processing and management of the spectrophotometer system 11. The microcomputer performs a number of tasks which may be summarized as follows:

(1) data is received from light measuring device 29 in the form of an analog signal which is converted to a digital signal for processing; the processed digital signal is converted to an analog recording signal for output along a bus 45 to recorder 39; the processed digital signal also is converted to display data for output along a bus 47 to a display 49;

(2) scanning information is received from a keyboard 51 via a bus 55 and is manipulated to provide output commands to indexing system 19 for sequencing (scanning) diffraction grating 15 through a spectral range at a preselected rate; and (3) other display data is generated and transmitted to display device 49 for visually displaying an indication of the particular wavelength of the monochromatic beam passing through sample cell 27.

Microcomputer 43 is a conventional 8-bit, parallel bus microprocessor having an accumulator, a plurality of registers, and a CPU control for interpretation and execution of micro-level assembly language instructions; a memory system including random access memory and read-only memory is also included in microcomputer 43, as will be understood. The microcomputer treats recorder 39, keyboard 51 and display device 49 as peripheral devices which are interconnected by means of bus cables.

One suitable microprocessor for use in microcomputer 43 is a Motorola MC6802. Reference is made to Motorola manual ADI-436 which describes the MC6802, and reference is made to "Introduction to Microprocessors," by Herve Tireford of Motorola Semiconductor Products, Inc., 1975.

The system is managed under the control of keyboard 51 permitting the operator to regulate the particular analysis performed by the system. For example, the spectral range over which the monochromatic beam is to be sequenced (scanned) may be selected from the keyboard. The speed in which indexing system 19 sequences the wavelength of the monochromatic light also may be selected by the operator via keyboard 51. And other control regulations may be performed by the keyboard as described in more detail in the referenced application Ser. No. 128,028.

Referring to FIG. 2, light chopper 25 is illustrated in relation to a preferred form of the optical paths of the spectrophotometer. Source 13 includes a lamp-filter-mirror arrangement described in more detail in the referenced application Ser. No. 128,030. A plurality of mirrors, slits and a field lens, as shown, are utilized to form the optical path of the system. Other optical paths may be devised as will suggest themselves to those skilled in the art.

Referring to FIG. 3, light chopper 25 and monitoring system 38 are illustrated in greater detail. The monochromatic beam passes into light chopper 25 along an optical path 57 and is reflected by a mirror 59 for transmission to measuring device 29. A chopper mirror 61 is rotatably mounted about a shaft 63 for chopping the beam twice per single revolution of shaft 63. Chopper mirror 61 includes a mirror surface 65 for reflecting the light beam onto measuring device 29 via reference system 31 as mirror surface 65 intersects beam path 57. Reference system 31 is illustrated in FIG. 2 by spherical mirrors 66, 68 for passing the light beam through a reference cell 26 and onto measuring device 29 which is formed of a photomultiplier tube 28. Chopper mirror 61 also includes a darkened surface 67 for absorbing the light as the darkened surface 67 intersects beam path 57. When neither surfaces 65, 67 are intersecting the beam path, the light is permitted to pass to mirror 59 for reflection to measuring device 29.

Synchronous motor 33 rotates shaft 63 via a coupling device 69. Coupling device 69 includes a first coupling member 71 fixed to shaft 63 and a second coupling member 73 fixed to the motor shaft 75 of synchronous motor 33. The two coupling members 71, 73 are set in close proximity to each other, however, the drawing of FIG. 3 shows the two in a spaced relationship for facilitating description of coupling device 69.

A synch wheel 77 is secured to shaft 63 for conjoint rotation therewith in a plane normal to the axis of shaft 63. Wheel 77 carries a plurality of apertures located at select radii with respect to the axis of shaft 63 for generating the synchronization signals via operation of a photocell/detector array 79. The synch wheel contains 64 holes equally spaced along an outer circumference, as indicated generally by reference numeral 81. As synch wheel 77 rotates, holes 81 are detected by a single photodetector of the photocell/detector array 79 for producing a pulsating signal along a CLOCK line 83 of bus 37. The frequency of the digital signal appearing on CLOCK line 83 is proportional to the frequency of power source 35.

Synch wheel 77 includes a pair of slotted radius openings 85, 87 located at a particular radius of the synch wheel 77. Openings 85, 87 extend along the circumference at the radius, in association with chopper mirror 61 for generally indicating when the monochromatic light is contacting mirror 59. A third and a fourth radius openings 89, 91 are located at different radii on wheel 77 with respect to each other and with respect to the radius of openings 85, 87 for synchronous movement with mirror surface 65 and darkened surface 67, respectively.

A separate photodetector monitors slots 85, 87 for producing an output on a SAMPLE line 93 for providing a signal indicative of when the monochromatic light is reflected from mirror 59 onto measuring device 29. Another photodetector of the photocell/detector array 79 monitors opening 89 for producing an output signal on a REFERENCE line 95 indicative of the time when mirror surface 65 is passing through beam path 57. A fourth photodetector of photocell/detector array 79 monitors opening 91 for producing a pulse output signal along DARK line 97 indicative of the passage of darkened surface 61 through beam path 57.

Where synchronous motor 33 is driven by a 60 Hz. line frequency, the signal appearing along SAMPLE line 93 will have a frequency of 30 Hz., whereas the signals appearing along REFERENCE line 95 and DARK line 97 will have a frequency of 15 Hz. The signals appearing along lines 83, 93, 95, 97 are utilized for demodulating the output signal of the photomultiplier tube 28 and for phasing the timing of certain microcomputer tasks to be synchronized with the line frequency.

As illustrated in FIG. 3, magnetic coupling members 71, 73 each include respective pin member 98, 99 for making coupling contact during rotation. Pin 98 extends from coupling member 71 along a line orthogonal to the axis of shaft 63, whereas pin 99 extends from coupling member 73 along a line parallel to the axis of shaft 63. Coupling members 71 and 73 are spaced in close confronting relationship so that pin 99 contacts pin 98 during rotation of coupling member 73 by synchronous motor 33. A pair of flat planar magnets 101, 103 are secured respectively to coupling elements 71, 73 in a position for presenting a flat planar face of each magnet, in confronting spaced relation for providing a magnetic interaction between magnets 101, 103. As will suggest itself, the magnetic strength of magnets 101, 103 will determine the extent of spacing between the magnet's faces.

Thus, synchronous motor 33 and shaft 63 are mechanically/magnetically coupled. With a mechanical coupling alone, shaft 63 would vary in speed if motor shaft 75 and shaft 63 are not concentric. This variation in speed would cause jittering in the timing of the spectrophotometer system. Also, with a mechanical coupling alone, the synchronous motor may cause jittering because its rotation is not smooth due to fluctuations in line current.

The magnetic coupling effect caused by magnets 101, 103 eliminates this jittering. Magnets 101, 103 magnetically interact for causing a spring-like damping force to occur between rotation of motor 33 and shaft 63. The damping force attenuates any oscillatory motion that would otherwise arise.

With a magnetic coupling alone, however, there would not exist a sufficient torque for starting rotation of shaft 63, because motor 33 starts quickly and its torque is unable to overcome the initial inertia of the synch wheel and chopper mirror combined. However, the combination of the mechanical coupling and magnetic coupling provides the proper starting torque and damping force for smooth rotation, eliminating any jittering or other oscillatory movement.

A conventional referencing system for controlling the zero adjustment and gain adjustment of the sample signal is utilized, as shown in FIG. 4. Monochromatic light passes into chopper 25 and three different types of light are monitored by photomultiplier 28: SAMPLE light monitored from light passing through the sample cell 27; REFERENCE light monitored from light passing through the reference cell 26; and DARK light monitored when the light beam strikes darkened surface 67 of chopper mirror 61.

The output signals of photomultiplier 28 for each of the three successively occurring types of light are passed to a demodulator 99 via a current-to-voltage converter 102. Demodulator 99 is driven by the synchronization signals appearing on lines 93, 95, 97 for passing the output signals of photomultiplier 28 to either a dark current integrator 104, a reference integrator 105 or a sample-and-hold circuit 107. Dark current integrator 104 receives the output signal for DARK light for zero adjusting the sample signal output via current to voltage converter 102. Reference integrator 105 receives the output signal for REFERENCE light for adjusting the gain of photomultiplier 28 via a high voltage control 109. Such zero adjust and gain adjust techniques are well known in the art.

The sample signal which is the output signal for SAMPLE light is fed to a sample-and-hold circuit 107 for transfer to microcomputer 43. The sample signal is converted to a digital signal by an A-to-D converter 110, for processing of the sample data. Once processed the sample data is reconverted to an analog signal via a D-to-A converter 111 for generating a recording signal along bus 45. As is understood, an abscissa and an ordinate signal may be generated along bus 45 permitting X-Y deflection of the recording element of recorder 39 if used. The ordinate signal may be derived from the indexing system now to be described.

The CLOCK signal appearing on line 83 will be 960 Hz. or 800 Hz. depending on whether the power source is 60 Hz. or 50 Hz. The CLOCK signal is fed to a programmable divider 113, which is programmed by the microcomputer in accordance with whether the line frequency is 50 Hz. or 60 Hz., for generating a 160 Hz. signal for either a 50 Hz. or 60 Hz. line frequency. The 160 Hz. signal is utilized to step the diffraction grating 15 via indexing system 19. Particularly, the 160 Hz. signal is fed to the $\overline{IRQ}$ pin of the MC6802 microprocessor 115 for effectively causing the monochrometer to sequence at a frequency proportional to the line frequency. Thus, the sequencing of wavelengths occurs at the same preselected rate for a 50 Hz. line and a 60 Hz. line.

The SAMPLE line 93, on the other hand, pulses at 30 or 25 Hz. depending on the line frequency. The pulsing signal on the SAMPLE line is fed to the $\overline{NMI}$ pin of the MC6802 microprocessor for line synchronous processing the SAMPLE signal from the photomultiplier tube 28.

The 160 Hz. signal entering $\overline{IRQ}$ is an interrupt signal for interrupting the main program of the microprocessor and performing an $\overline{IRQ}$ interrupt routine. When interrupted, the main program stops and the $\overline{IRQ}$ interrupt routine is initiated. The $\overline{IRQ}$ interrupt routine includes a plurality of instructions for executing a change in wavelength via the indexing system 19 and for executing a filter change in radiant energy source 13, if necessary, (see referenced U.S. Patent Application Serial No. 128,030. Such software programming may take on various forms. The microcomputer is merely instructed to transmit a stepping signal to the stepper motor of indexing system 19. The $\overline{IRQ}$ interrupt routine will utilize certain RAM locations where the main program has stored certain data, as for example, data indicating the speed of sequencing which it has received from keyboard 51.

The signal appearing on SAMPLE line 93 is a 30 Hz. signal or a 25 Hz. signal depending upon whether the line frequency is 60 Hz. or 50 Hz. The signal on SAMPLE line 93 is fed to an $\overline{NMI}$ port of microprocessor 115. The $\overline{NMI}$ port also serves as an interrupt for interrupting the main program routine to execute an $\overline{NMI}$ routine. The $\overline{NMI}$ interrupt signal of line 93 and the $\overline{IRQ}$ interrupt signal from programmable divider 113 in some cases, may overlap. The microprocessor will interrupt an $\overline{NMI}$ interrupt routine if a second interrupt is received, after which it will return to the first interrupt routine, i.e., if an $\overline{IRQ}$ interrupt is generated during processing of the $\overline{NMI}$ routine, the $\overline{NMI}$ routine stops and the $\overline{IRQ}$ routine is initiated, after which return is made to the $\overline{NMI}$ routine for completion.

The $\overline{NMI}$ routine serves as a synchronization for the instrument. The $\overline{NMI}$ routine reads the A-to-D converter 110 and stores the information in RAM location. After the A-to-D converter 110 is read the $\overline{NMI}$ routine resets the A-to-D converter for its next conversion. The NMI routine then stores a message in RAM for telling the main program that new data is ready to be processed. The NMI routine also serves to aid in programming divider 113.

When microprocessor 115 programs programmable divider 113, a counter 117 is utilized for determining whether the power line is 50 Hz. or 60 Hz. Counter 117 is driven by the microprocessor's internal clocking signal at port E which clocks at a 1 megahertz rate. During the NMI routine counter 117 is reset. During the next NMI routine, the counter is read and a decision is made as to whether the power line is 50 Hz. or 60 Hz. This decision is stored in memory so that the main program can program programmable divider 113 accordingly. The counter is then reset.

The main program routine takes care of all of the other data handling activities of the system, utilizing the data fetched by the NMI routine for processing and outputs the processed data to the D-to-A converter 111 for generating recording signal 45.

It should be understood, of course, that the foregoing disclosure relates to preferred embodiment of the invention and that other modifications or alterations may be made therein without departing from the spirit or scope of the invention as set forth in the appended claims.

What is claimed is:

1. A spectrophotometer comprising:
monochromator means for providing monochromatic light at a sequence of wavelengths over a predetermined spectral range;
a sample cell;
a light measuring device;
means for directing said monochromatic light through said sample cell onto said light measuring device;
light chopper means for alternately directing monochromatic light to said sample cell and along a second reference path;
motor means connectable to an A.C. power source for controlling the frequency of chopping by said chopper means in proportion to the line frequency of the power source;
recorder means for recording at a line synchronous rate an indication of the spectral response of said measuring device;
monitoring means for monitoring the line frequency of the power source and generating an output digital signal at a frequency proportional to line frequency; said monitoring means including damping means; and
microcomputer means for receiving output data as a digital sample signal from said measuring device and presenting data converted at a line synchronous rate to said recorder means.

2. A spectrophotometer according to claim 1 wherein said monitoring means generates a second digital signal whose frequency is proportional to the line frequency of the power source; and further including
programmable divider means for receiving said second digital signal and dividing said second digital signal for generating a predetermined frequency indexing signal; and
wherein said microcomputer means programs said divider means according to the line frequency of the power source; and
wherein said monochromator means is controlled by said microcomputer means for sequencing through said spectral range at a rate proportional to said indexing signal.

3. A spectrophotometer according to claim 2, wherein said motor means is connectable to an A.C. power source having a line of frequency of 50 Hz. or 60 Hz.; and
wherein said microcomputer means programs said divider means according to a 50 Hz. or a 60 Hz. line frequency for generating said indexing signal with the same frequency at either 50 Hz. or at 60 Hz. line frequency.

4. A spectrophotometer according to claim 1, wherein said recorder means is connectable to the A.C. power source for movement of a recording medium at a rate proportional to the line frequency of the power source; and
wherein said microcomputer means generates a recording signal for transmission to said recorder means in accordance with said digital sample signal.

5. A spectrophotometer according to claim 2, and further including display means controllable by said microcomputer for visually displaying an indication of the particular wavelength of the monochromatic beam passing through said sample cell; and
wherein the microcomputer means controls said display means for indexing said visual indication at a rate proportional to said indexing signal.

6. A spectrophotometer according to claim 2, and further including keyboard means manually operable for controlling said microcomputer means, said keyboard means selectively operable for selecting the sequence rate of said monochrometer means to a rate proportional to said indexing signal.

7. A spectrophotometer according to claim 1, wherein said microcomputer means updates data from said measuring device at a frequency proportional to the line frequency of the power source.

8. A spectrophotometer according to claim 1, wherein said motor means is a synchronous motor.

9. A spectrophotometer according to claim 1, wherein said monitoring means includes disc means driven by said motor means and carrying said timing information; and
sensing means for sensing said timing information carried by said disc means and responsively generating said output digital signal.

10. In a spectrophotometer according to claim 9, wherein said timing information includes aperture means formed in said disc means and wherein said sensing means includes a photo-optical means for sensing said aperture means during driving of said disc means.

11. A spectrophotometer according to claim 1 wherein said chopper means includes a mechanical blocking means movable in and out of the path of said monochromatic light at a frequency proportional to the line frequency of the power source.

12. A spectrophotometer according to claim 1 wherein said monitoring means and said damping means include a combination mechanical-magnetic coupling means driven by said motor means.

13. A spectrophotometer according to claim 12 wherein said monitoring means carries timing information, and sensing means for sensing said timing information and in response thereto generating said output digital signal.

14. A spectrophotometer according to claim 9 wherein said disc means is driven through a combination mechanical-magnetic coupling means.

15. A spectrophotometer according to claim 14 wherein said coupling means is characterized by the provision of mechanical starting torque and spring-like driving torque when normal rotational speed is attained.

16. A spectrophotometer according to claim 12 or claim 14 wherein said combination mechanical-magnetic coupling means includes a pin-type coupling means for providing starting torque and magnetic means for maintaining operating speed.

* * * * *

UNITED STATES PATENT AND TRADEMARK OFFICE
CERTIFICATE OF CORRECTION

PATENT NO. : 4,332,470

DATED : June 1, 1982

INVENTOR(S) : Morteza M. Chamran et al.

It is certified that error appears in the above-identified patent and that said Letters Patent is hereby corrected as shown below:

In the Abstract, line 17, "providing compliance" should read
-- providing magnetic compliance --.

Column 6, line 41, "No. 128,030." should read -- No. 128,030). --

*Signed and Sealed this*

*Second* Day of *November 1982*

[SEAL]

*Attest:*

GERALD J. MOSSINGHOFF

*Attesting Officer*   *Commissioner of Patents and Trademarks*